Aug. 19, 1941.  H. E. WILLIAMS  2,252,745
DRILL BIT HEAD
Filed Jan. 10, 1939

INVENTOR.
HOWARD E. WILLIAMS.
BY
ATTORNEY.

Patented Aug. 19, 1941

2,252,745

UNITED STATES PATENT OFFICE 2,252,745

DRILL BIT HEAD

Howard E. Williams, Huntington Park, Calif.

Application January 10, 1939, Serial No. 250,137

1 Claim. (Cl. 255—63)

This invention relates to a drill head for use particularly in the drilling of rock or the like, for the purpose of placing explosive charges in the drilled holes, whereby sections of the rocky structure are broken up for various uses.

My drill head is particularly useful in connection with a percussion type of tool, such as a pneumatic hammer rotary drill and the like.

An object of my invention is to provide a novel drill head provided with replaceable blades which can be quickly and easily removed and rearranged in the drill head, thereby enabling said head to retain its proper gauge and enabling the workman to progress further with the drill head without requiring an entire change of the tool.

Another object is to provide a novel drill head in which the removable blades are held in position in the drill head in an effective manner by means of a novel blade holder and lock.

A feature of my invention resides in the novel means of locking the cutter blades in the drill head by means of a blade holder which is engaged by the end of the threaded shank, thereby pressing the blade holder tightly against the blades and thereby holding said blades in the head.

Other objects, advantages and features of invention may appear from the accompanying drawing, the subjoined detailed description and the appended claim.

Figure 1:
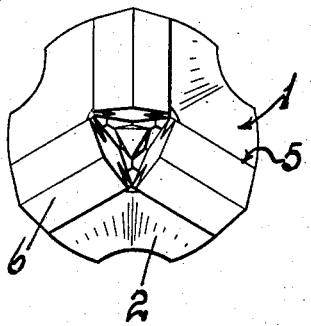
Figure 1 is a top plan view of my drill head.

Referring more particularly to the drawing, the numeral 1 indicates the chuck forming part of the drill head, and this chuck is substantially cylindrical in form. The chuck is provided with longitudinal grooves 2 to permit passage of the water and material, which moves past the drill head in the usual and well-known manner.

Figure 2:
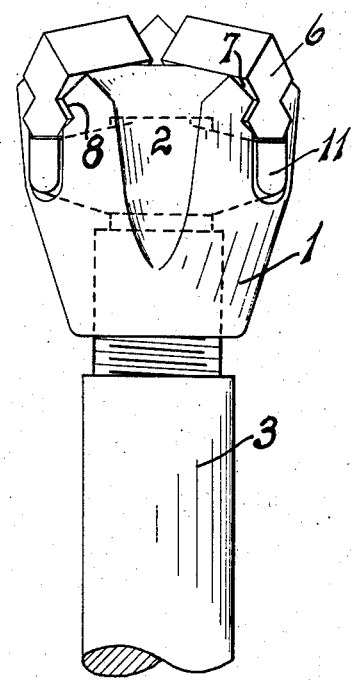
Figure 2 is a side elevation of the same.

A shank or drill stem 3 extends from the drilling engine of any usual and well-known type, and the outer end of the drill stem is threaded into the lower end of a bore 4 in the chuck. The chuck is also provided with a plurality of radial grooves 5, which intersect the central bore 4. The radial grooves 5 are each adapted to receive a cutter blade 6. The cutter blades 6 are multisided, and each are provided with recesses 7, said recesses being oppositely arranged on each of the blades. The chuck 1 is provided with shoulders 8, which engage the recesses 7, as shown in Figure 2, thus holding the blades 6 against outward movement in the chuck. As shown in Figures 1 and 2, a sharp edge of each of the blades is presented to the surface to be cut, and these blades can be turned end for end, as well as reversed, thus providing a number of positions for each of the blades and enabling the tool to operate for a considerable length of time. If the gauge of the tool decreases, the cutter blades 6 are turned end for end, thus bringing the gauge of the tool out to the original dimension, and if the cutting edges become worn, the blades are reversed, thus presenting a new cutting edge to the surface to be drilled.

For the purpose of holding the cutter blades 6 in position in the chuck, I provide a blade holder and lock 9. This blade holder consists of a central hub 10, which fits within the bore 4 of the chuck, and a plurality of radial arms 11, which are arranged within the grooves 5 of the chuck. The arms 11 and the hub 10 are preferably integrally formed as shown. The arms 11 of the holder are trough-like in cross section so as to receive the lower edge of the blades 6. When the shank 3 is screwed into the chuck 1, it will bear against the hub portion 10 of the blade holder, thus urging the blade holder upwardly, and thereby pressing the blades 6 tightly against the shoulder 8, thus holding all of the blades in drilling position in the chuck. The arms 11 of the blade holder are preferably tilted so that the inner portion of the blades is somewhat higher than the outer edge of the blades. However, this is a detail which varies with the desire of the user.

Figure 3:
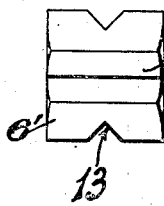
Figure 3 is a side elevation of one of the blades, showing one type thereof.
Figure 4:
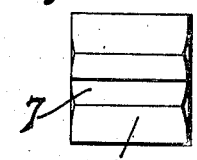
Figure 4 is a side elevation of another type of blade.
Figure 5:
Figure 5 is an end view of one of the blades, as shown in Figure 4.
Figure 6:
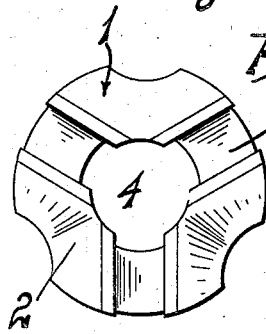
Figure 6 is a plan view of the chuck.
Figure 8:
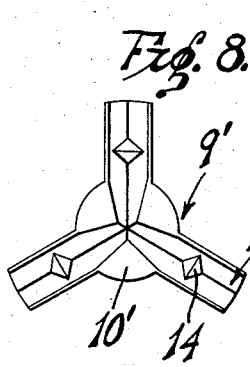
Figure 8 is a plan view of another type of blade holder.
Figure 7:
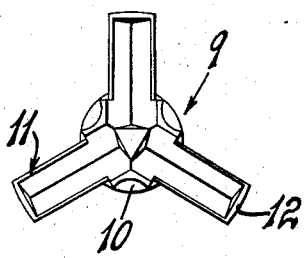
Figure 7 is a plan view of one form of blade holder.
Figure 9:
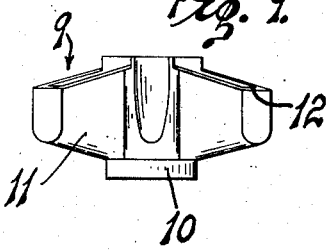
Figure 9 is a side elevation of the type of blade holder as shown in Figure 7.

To limit the outward movement of the blades 6 in the chuck, a lip 12 is provided on the outer end of each of the arms 11, and the outer surface of the blades bears against this lip, thus effectively holding the blades against outward movement. The outward movement of the blades can also be stopped by means of a notch 13, which is cut in the cutter blade 6', as shown in Figure 3. This notch rests over a projection 14 shown in Figure 8 in the groove part of the arms 11', and when the blade holder is pressed tightly against the blades, the projection 14 fitting into the notch 13 will effectively hold the blades against movement in the chuck. The blade holder 9' shown in Figure 8 is formed with a hub 10', the purpose of this hub being the same as the hub 10.

To adjust or replace the blades 6 in the chuck, it is only necessary to loosen the drill stem 3, whereupon the blade holder 9 will drop downwardly a small amount sufficient to permit each of the blades 6 to be slid longitudinally out of the chuck and thereafter adjusted as desired.

Having described my invention, I claim:

A drill head comprising a chuck, said chuck having a central bore and a plurality of radial grooves extending from the bore, a drill stem threaded into the bore, each of said grooves being adapted to receive a blade, shoulders on the chuck engaging each of the blades, a blade holder including a plurality of arms, each of the arms extending into a groove, each of said arms bearing against the bottom of a blade, said drill stem bearing against the blade holder and pressing said holder against the blades, means on each of the arms engageable by a blade whereby radial movement of the blade in the chuck is prevented, said means comprising a projection on each of the arms, said projection engaging a blade.

HOWARD E. WILLIAMS.